United States Patent [19]

Aoi

[11] Patent Number: 4,783,590

[45] Date of Patent: Nov. 8, 1988

[54] ERROR SIGNAL PRODUCING DEVICE HAVING IMPROVED LINEARITY

[75] Inventor: Shigeru Aoi, Kawasaki, Japan

[73] Assignee: Canon Kabushiki Kaisha, Tokyo, Japan

[21] Appl. No.: 896,195

[22] Filed: Aug. 14, 1986

[30] Foreign Application Priority Data

Aug. 30, 1985 [JP] Japan .................. 60-189435

[51] Int. Cl.$^4$ ............................................. G05B 1/00
[52] U.S. Cl. ...................................... 250/202; 369/46
[58] Field of Search ............... 250/201 DF, 202, 204; 369/44, 45, 46

[56] References Cited

U.S. PATENT DOCUMENTS

| 3,923,401 | 12/1975 | Llop et al. | 250/202 |
| 4,152,586 | 5/1979 | Elliott et al. | 250/201 |
| 4,652,738 | 3/1987 | Nishihara et al. | 250/202 |

FOREIGN PATENT DOCUMENTS

| 2739024 | 3/1979 | Fed. Rep. of Germany . |
| 2394106 | 1/1979 | France . |
| 84/01849 | 5/1984 | PCT Int'l Appl. . |

Primary Examiner—David C. Nelms
Assistant Examiner—William L. Oen
Attorney, Agent, or Firm—Fitzpatrick, Cella, Harper & Scinto

[57] ABSTRACT

An error signal detecting device is composed of means for irradiating an object with a concentrated light beam, a photosensor having a photoreceptor face divided into plural portions and adapted to receive the light reflected or transmitted by the object, a device for respectively dividing a first output and a second output obtained respectively from the first and second portions of the photoreceptor face of the photosensor, a first comparator for respectively comparing the outputs divided from the first output with the second output, a second comparator for respectively comparing the outputs divided from the second output with the first output, and a device for deriving a positional error signal indicating the positional error of the light beam spot with respect to the surface of the object, at least in one of the direction of optical axis and a direction perpendicular to the optical axis.

5 Claims, 4 Drawing Sheets

ERROR SIGNAL PRODUCING DEVICE HAVING IMPROVED LINEARITY

BACKGROUND OF THE INVENTION

1. Field of the Invention

The present invention relates to an error signal detecting device, in irradiating an object with a light beam concentrated as a spot, for detecting a positional error of said spot with respect to said object along the direction of the optical axis (so-called focusing error), or a positional error in a direction perpendicular to the optical axis (so-called tracking error), and in particular such error signal detecting device adapted for use in an optical information record/regenerating apparatus for optically recording or regenerating information.

2. Related Background Art

In an optical information record/regenerating apparatus, a light beam irradiates an optical recording medium such as an optical disk or a magnetooptical disk, and a reflected or transmitted light is utilized for focus control and tracking control by driving a servo system. In the following there will be explained a focus control process in a conventional optical information record/regenerating apparatus.

FIG. 1 is a schematic view of an example of conventional optical information record/regenerating apparatus, wherein a light beam emitted by a light source 37 such as a semiconductor laser is converted into a parallel beam by a collimating lens 38, then guided through a beam splitter 39 and concentrated as a spot on a recording medium 1 such as an optical disk by means of an objective lens 2. The light reflected by said recording medium 1 is guided again through the objective lens 2, then reflected by the beam splitter 39 and focused onto a photosensor 4 by a condenser lens 3. By modulating said light beam with an information signal, said information is recorded on said recording medium 1 in the form of pit patterns which are optically detectable for example by changes in the reflectance. The information thus recorded can be regenerated by irradiating said recording medium 1 with an unmodulated light beam and photoelectrically converting the reflected light, modulated by said pit patterns, by means of said photosensor 4. Also from the output of said photosensor 4 there can be detected a focusing error signal and a tracking error signal.

FIG. 2A is a schematic view of a light-receiving optical system, for showing the principle of focus error detection in the above-explained optical information record/regenerating apparatus, and FIG. 2B is a schematic plan view of a two-division photosensor employed in said optical system. FIG. 3A is a chart showing the relationship between the distance of the optical system and recording medium and the outputs $a_0$, $b_0$ of said two-division photosensor, and FIG. 3B is a chart showing the relationship between said distance of deviation and ($a_0 - b_0$).

In FIG. 2A, the light reflected or transmitted by the recording medium 1 is transmitted by the objective lens 2 and is concentrated by the condenser lens 3. The converging point is at f if the objective lens 2 is spaced by a predetermined distance from the recording medium 1, but moves toward f' or f'' respectively if the objective lens 2 is closer to or farther from the recording medium 1.

The photosensor 4 is positioned slightly closer to the condenser lens 3 than the moving range of said converging point. As shown in FIG. 2A, the photosensor 4 is divided into a circular central portion 5a of a predetermined area and a peripheral portion 5b, respectively releasing electric signals $a_0$, $b_0$ corresponding to the amounts of incident light. Consequently a change in the distance between the objective lens 2 and the recording medium 1 causes a change in the amounts of light entering the central portion 5a and the peripheral portion 5b, and the focus can be controlled by said change.

The photosensor 4 is so regulated that the central portion 5a and the peripheral portion 5b provide same outputs $a_0$, $b_0$ as shown in FIG. 3A when the objective lens 2 is at the predetermined distance, i.e. zero deviation, from the recording medium 1. In such a state, if the objective lens 2 moves closer than said predetermined distance (negative deviation), the converging point moves toward f' to increase the irradiated area on the photosensor 4, whereby the output $a_0$ of the central portion 5a decreases while the output $b_0$ of the peripheral portion 5b increases. On the other hand, if it moves farther than said predetermined distance (positive deviation), the converging point moves toward f'' to decrease the irradiated area on the photosensor 4, whereby the output $a_0$ of the central portion 5a increases while that $b_0$ of the peripheral portion 5b decreases. Consequently an error signal ($a_0 - b_0$) indicating the difference of two outputs $a_0$, $b_0$ assumes a form shown in FIG. 3B, and can be used for focus control in a range where the deviation is small.

However, as will be understood from FIG. 3B, said error signal ($a_0 - b_0$) does not vary linearly even when the deviation is small, and is smaller when the objective lens 2 is close to the recording medium 1 than when the objective lens 2 is far from the recording medium 1. For this reason stable focus control cannot be achieved in the conventional optical information record/regenerating apparatus.

The unstability in control resulting from non-linearity of the error signal exists also in the well known focus error detection utilizing a knife edge, or in the tracking control for causing the light beam to following a recording track on the recording medium.

In addition to the foregoing drawback, the conventional technology has been associated with another drawback explained in the following.

In general the power of the light beam is stronger at recording than at regenerating, and, in case of recording on a disk-shaped recording medium, the power has to be made stronger in the external portion than in the internal portion, in consideration of a difference in the peripheral speed. In this manner the power of the light beam is not constant but is varied by various conditions.

Consequently the intensity of the light reflected or transmitted by the recording medium 1 varies likewise, and the outputs $a_0$, $b_0$ of the photosensor 4 varies correspondingly. In order to achieve stable focus control and tracking control under such condition, the gain of the servo mechanism has to be automatically regulated so as to obtain an averaged servo signal regardless of the change in the power of light beam.

For this reason, as proposed in the Japanese Patent Publication No. 56138/1982, a voltage-controlling amplifier or a dividing circuit is provided in the loop of the automatic focus control system, and the focus control is conducted by driving the objective lens with a servo circuit of a gain inversely proportional to the amount of incident light. In such an operation the voltage-controlling amplifier or the dividing circuit is usually operated in a linear characteristic portion of transistors.

However, if the difference in the amount of light is large between the recording and regenerating operations, or if the reflectance of the recording medium fluctuates considerably, the transistors have to be operated in non-linear range, so that it has been difficult to achieve acceptably stable control corresponding to the change in the amount of light.

As explained in the foregoing, the conventional optical information record/regenerating apparatus has been unable to achieve stable focus and tracking controls because of the facts that the error signal does not vary linearly and that the linearity of characteristics of the signal processing circuit is easily affected when the amount of incident light varies significantly.

SUMMARY OF THE INVENTION

An object of the present invention is to provide an error signal detecting device not associated with the drawbacks of prior technology and capable of providing an error signal fundamentally superior in linearity.

Another object of the present invention is to provide an error signal detecting device capable of stable detection of the error signal, without being influenced by a change in the intensity of the light beam irradiating an object.

The foregoing objects can be achieved, according to the present invention, by an error signal detecting device comprising:

means for irradiating an object with a concentrated light beam;

a photosensor having a photoreceptor face divided into plural portions and adapted to receive the light reflected or transmitted by said object;

means for respectively dividing a first output and a second output respectively obtained from first and second portions of the photoreceptor face of said photosensor;

first comparator means for comparing each of divided outputs divided from said first output with said second output;

second comparator means for comparing each of divided outputs divided from said second output with said first output; and means for deriving, from the outputs of said first and second comparator means, a positional error signal representing the deviation of the spot of said beam in at least one of the direction of the optical axis with respect to the surface of said object and the direction perpendicular to the optical axis.

DETAILED DESCRIPTION OF THE PREFERRED EMBODIMENTS

Now the present invention will be clarified in detail by an embodiment thereof shown in the attached drawings.

Figure 1:
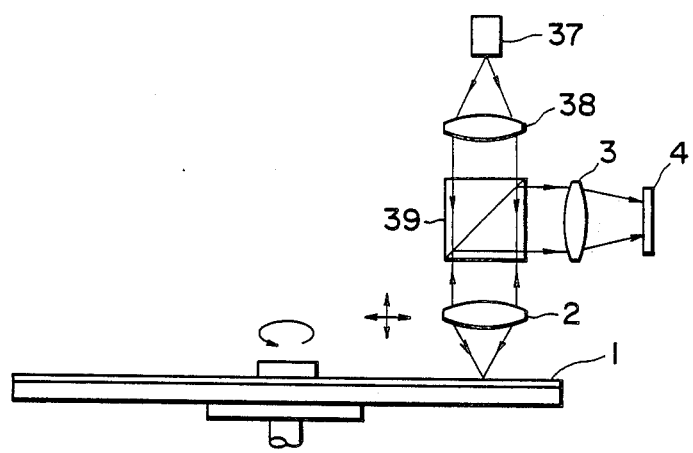
FIG. 1 is a schematic view of an example of conventional optical information record/regenerating apparatus.
Figure 2A:
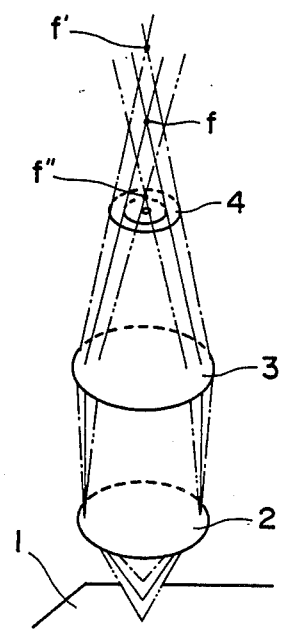
FIG. 2A is a schematic view of a light-receiving optical system of the apparatus shown in FIG. 1.
Figure 2B:
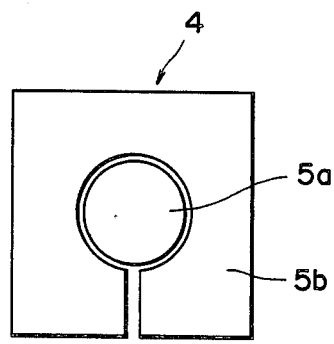
FIG. 2B is a schematic plan view of a photosensor employed in the optical system shown in FIG. 2.
Figures 3A, 3B:
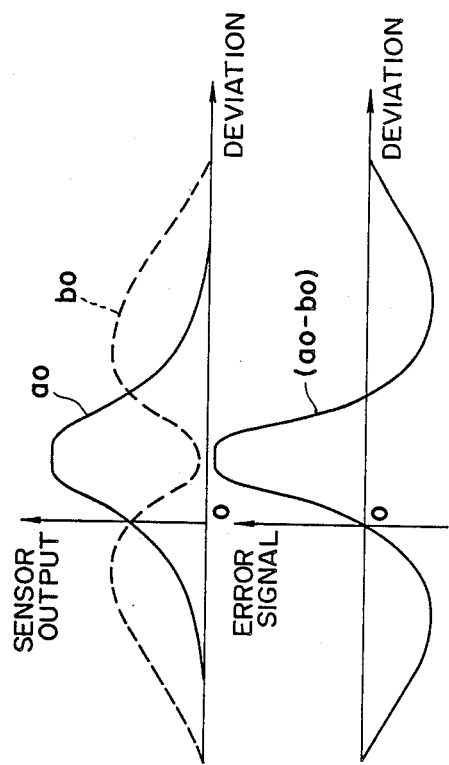
FIGS. 3A and 3B are charts showing signals obtainable from the photosensor shown in FIG. 2B.
Figure 4:
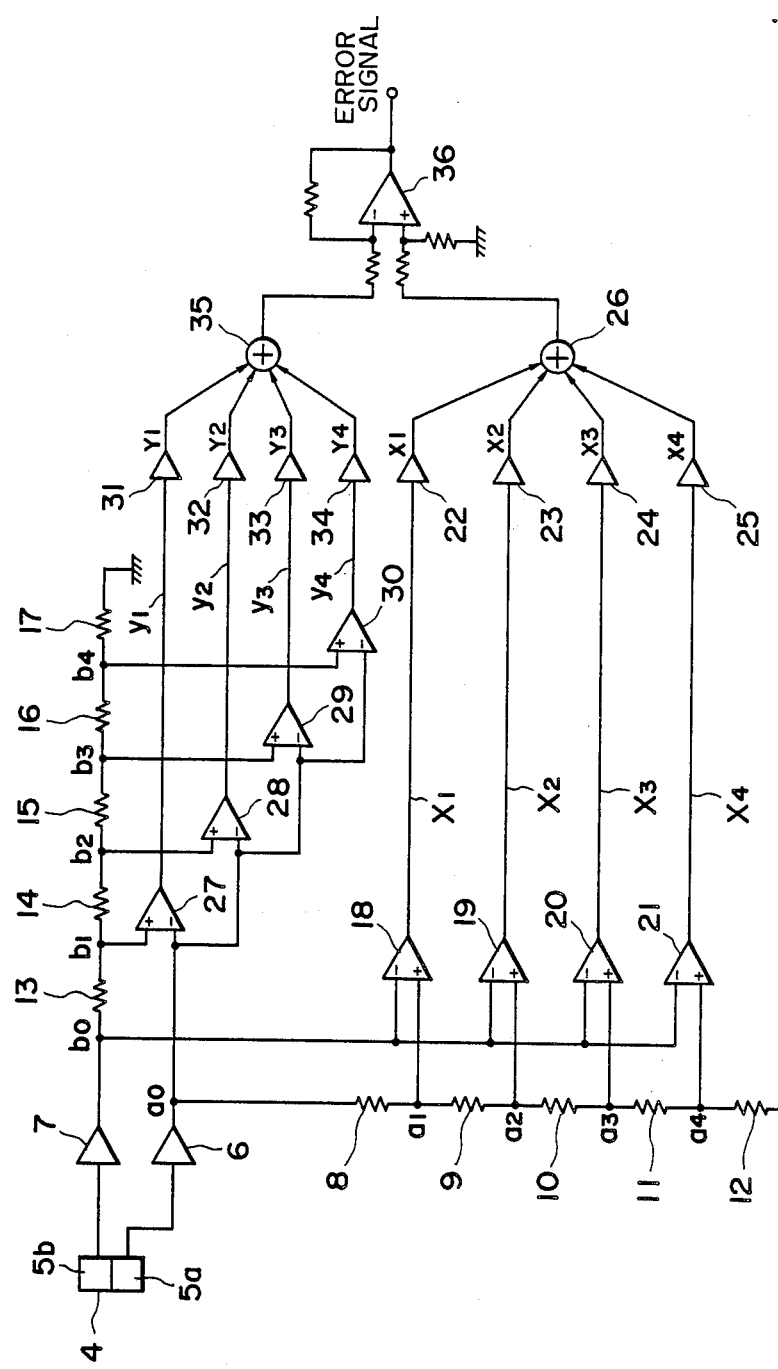
FIG. 4 is a block diagram of an error detecting circuit embodying the present invention.

FIG. 4 is a circuit diagram of a focus error detecting circuit for use in an optical information record/regenerating apparatus, embodying the present invention, wherein a photosensor 4 has a structure shown in FIG. 2B, and the structure of the apparatus leading to said photosensor is the same as already explained in relation to FIGS. 1 and 2A.

In FIG. 4, the output terminals of the central portion $5a$ and peripheral portion $5b$ of the divided photosensor 4 are respectively connected to amplifiers 6, 7. The output terminal of said amplifier 6 is grounded through voltage-dividing resistors 8–12, while that of the amplifier 7 is grounded through voltage-dividing resistors 13–17. The output $a_0$ of the central portion $5a$ after amplification by the amplifier 6 is divided into voltages $a_1$–$a_4$ by the resistors 8–12, and the output $b_0$ of the peripheral portion $5b$. after amplification by the amplifier 7 is divided into voltages $b_1$–$b_4$ by the resistors 13–17.

Comparators 18–21 receive the output $b_0$ at inverted input terminals thereof, and the divided voltages $a_1$–$a_4$ at non-inverted input terminals thereof, and supply outputs $x_1$–$x_4$ to an adder 26 after amplification by amplifiers 22–25. Also comparators 22–25 receive the output $a_0$ at inverted input terminals thereof and the divided voltages $b_1$–$b_4$ at non-inverted input terminals thereof, and supply output $y_1$–$y_4$ to an adder 35 after amplification by amplifiers 31–34. The gains of the amplifiers 22–25, 31–34, illustrated in FIG. 4 are regulated to generate error signals and can be arbitrarily adjustable according to the slope of the error signal, as will be explained later.

The outputs of the adders 26, 35 are supplied to a differential amplifier 36, whose output terminal produces the error signal.

In the following there will explained the focus error detecting operation of the above-explained embodiment, while making reference to FIG. 5.

Figure 5A:
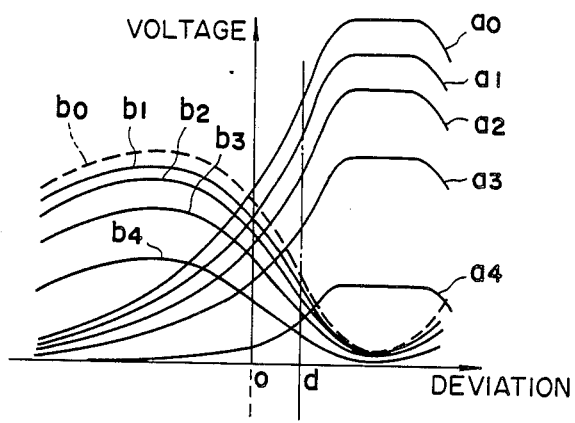
FIGS. 5A, 5B and 5C are charts showing signals in various parts of the circuit shown in FIG. 4.
Figure 5B:
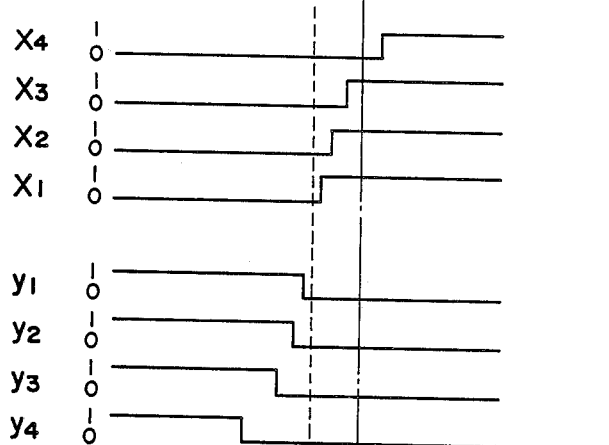
Figure 5C:
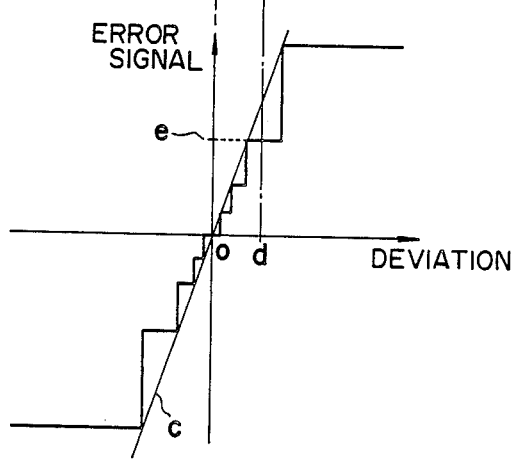

FIG. 5A is a wave form chart showing the outputs $a_0$, $b_0$ of the photosensors and the divided voltages thereof, while FIG. 5B is a wave form chart showing the outputs of the comparators, and FIG. 5C is a chart showing the relationship between the distance of deviation and the error signal. In these charts the abscissas represent the deviation in the same scale.

The comparators 18–21 compare the divided voltages $a_1$–$a_4$ of the output $a_0$ with the output $b_0$, and provide outputs $x_1$–$x_4$ of a high level "1" or a low level "0" respectively if the divided voltages $a_1$–$a_4$ are larger or smaller than the output $b_0$. Similarly the comparators 27–30 provide outputs $y_1$–$y_4$ of a high level "1" or a low level "0" respectively when the divided voltages $b_1$–$b_4$ are larger or smaller than the output $a_0$. Consequently the outputs $x_1$–$x_4$ assume the state "1" in succession according to amount of deviation when the objective lens 2 moves farther from the recording medium 12 then the in-focus distance, while the outputs $y_1$–$y_4$ assume the state "1" in succession according to the amount of deviation when the objective lens moves closer than said in-focus distance (cf. FIG. 5B).

The outputs $x_1$–$x_4$ and $y_1$–$y_4$ are respectively amplified by amplifiers 22–25 and 31–34 with gains which are selected larger for larger absolute amounts of deviation. More specifically the gains of said amplifiers 22-25 and 31-34 are so selected that the synthesized error signal follows a line c shown in FIG. 5C.

However the outputs $x_1$ and $y_1$ should rise at a deviation within the focal depth of the optical system including the objective lens 2. It is also desirable to select the voltage-dividing resistors 8-17 in such a manner that the steps of the error signal are as small as possible in a small range around zero deviation, and to increase the number of said resistors if required.

In the following there will be explained a focus error detecting operation, in case the objective lens 2 moves farther from the recording medium 1 than the in-focus distance.

It is assumed that the objective lens 2 has moved by a distance d farther from the recording medium 1. In this state, as shown in FIG. 5B, the outputs $y_1$-$y_4$ are all "0", while the outputs $x_1$-$x_3$ are "1" and $x_4$ is "0". Consequently the adder 26 receives "1", "1", "2" and "0" while the adder 35 receives "0", "0", "0" and "0". Thus the differential amplifier 36 receives a voltage indicating "4" at the non-inverted input terminal and a voltage indicating "0" at the inverted input terminal, thereby providing an error signal e corresponding to the voltage difference "4" as shown in FIG. 5C. An unrepresented drive system is driven in response to said error signal e to displace the optical system including the objective lens 2, so as to reduce the amount of deviation d.

In this manner there is achieved an extremely stable automatic focus control without the influence of variation in the amount of light entering the photosensor 4, as plural comparators are employed for obtaining a stepwise error signal.

In the foregoing embodiment there is employed a two-divided photosensor for detecting the focus error, but it will be apparent that the present invention is also applicable for focus error detection by an astigmatism process employing a four-divided photosensor.

In addition to the focus control, it is also possible to derive an error signal in a similar manner in case of tracking control. For example, in case of 3-beam tracking control, control can be achieved by replacing the central portion 5a and peripheral portion 5b of the photosensor 4 shown in FIG. 4 with a photosensor divided for tracking control, and by selecting the ratio of voltage-dividing resistors so as to obtain a linearly varying error signal as shown in FIG. 5C.

Furthermore, if the object is translucent, an error signal can be similarly obtained from the light transmitted by the object. Also the present invention is applicable not only to the aforementioned optical information record/regenerating apparatus but also various apparatus such as a distance measuring apparatus. Furthermore the present invention is subject to various modifications within the scope and spirit of the appended claims.

What I claim is:

1. An error signal detecting device for producing a signal representing a positional error of a spot formed by irradiating an object with a light beam concentrated with lens means, the error being measured with respect to the surface of said object at least in one of the direction of the optical axis and the direction perpendicular to said optical axis, said device comprising:
   means for irradiating the surface of said object with a concentrated light beam;
   a photosensor having a photoreceptor face divided into plural portions including a first portion and a second portion and adapted to receive the light reflected or transmitted by the surface of said object;
   first means for providing a first set of plural outputs from a first output of said first portion of said photoreceptor face, each of said plural outputs being related to said first output by different ratios;
   second means for providing a second set of plural outputs from a second output of said second portion of said photoreceptor face, each of said plural outputs being related to said second output by different ratios;
   first comparator means for comparing each of said plural outputs of said first set with said second output;
   second comparator means for comparing each of said plural outputs of said second set with said first output; and
   means for deriving said signal representative of positional error from outputs of said first and second comparator means.

2. An error signal detecting device according to claim 1, wherein said first and second means comprise plural resistors connected between said first or second portion of the photoreceptor face and ground, and plural output terminals respectively connected to junctions of said resistors.

3. An error signal detecting device according to claim 2, wherein said first comparator means comprises a first group of comparators one input of each of which being respectively connected to said first set of plural outputs and the other input being connected to the second portion of said photoreceptor face, and said second comparator means comprises a second group of comparators one input of each of which being respectively connected to said second set of plural outputs and the other input being connected to the first portion of said photoreceptor face.

4. An error signal detecting device according to claim 3, wherein said signal deriving means comprises a first group of amplifiers of at least two different gains connected respectively to said first group of comparators, a first adder for summing the outputs of the amplifiers of said first amplifier group, a second group of amplifiers of at least two different gains respectively connected to said second group of comparators, a second adder for summing the outputs of the amplifiers of said second amplifier group, and a differential amplifier for obtaining the difference of the outputs of said first and second adders.

5. An error signal detecting device according to claim 1, wherein the photoreceptor face of said photosensor is divided into a circular central portion and a surrounding peripheral portion, and said signal deriving means is adapted to release a focus error signal indicating the positional error of said spot in the direction of the optical axis.

* * * * *